(12) United States Patent
Kline et al.

(10) Patent No.: US 10,043,317 B2
(45) Date of Patent: Aug. 7, 2018

(54) VIRTUAL TRIAL OF PRODUCTS AND APPEARANCE GUIDANCE IN DISPLAY DEVICE

(71) Applicant: INTERNATIONAL BUSINESS MACHINES CORPORATION, Armonk, NY (US)

(72) Inventors: Eric V. Kline, Rochester, MN (US); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/356,300

(22) Filed: Nov. 18, 2016

(65) Prior Publication Data

US 2018/0144548 A1    May 24, 2018

(51) Int. Cl.
    *G09G 5/00* (2006.01)
    *G06T 19/00* (2011.01)
    *G06F 3/00* (2006.01)
    *G06F 3/01* (2006.01)

(52) U.S. Cl.
    CPC .......... *G06T 19/006* (2013.01); *G06F 3/005* (2013.01); *G06F 3/011* (2013.01)

(58) Field of Classification Search
    None
    See application file for complete search history.

(56) References Cited

U.S. PATENT DOCUMENTS

| 8,791,942 B2* | 7/2014 | Rivers .................. G06T 15/02 345/419 |
| 9,311,746 B2 | 4/2016 | Gravois et al. |
| 2004/0246199 A1* | 12/2004 | Ramian .................. G09G 3/003 345/6 |

(Continued)

FOREIGN PATENT DOCUMENTS

| EP | 2775456 | 7/2015 |
| WO | 20150872747 | 6/2015 |

OTHER PUBLICATIONS

Siluk, "Samsung Debuts Mirror, Transparent OLED Displays to Engage Customers", Cio Today (2015).

(Continued)

*Primary Examiner* — Frank Chen
(74) *Attorney, Agent, or Firm* — Heslin Rothenberg Farley & Mesiti P.C.

(57) ABSTRACT

A method, computer program product, and a display device for enabling a user to virtually interact with an object includes a processor in the display device utilizing an image capture in the display device, to identify a subject in a three dimensional space proximate to the display device. The processor virtualizes the subject to generate a computer model of the subject and generating mappings between the computer model of the subject and the passive reflection of the subject. The processor obtains a computer model of an article and superimposes the models in three dimensional space by joining the models at selected reference point(s). The processor renders an image that includes the passive (Continued)

reflection of the subject visually superimposed with the computer model of the article, such that a movement by the subject, when obtained by the processors via the image capture device, is reflected in real-time in the image.

16 Claims, 10 Drawing Sheets

(56) References Cited

U.S. PATENT DOCUMENTS

| | | | | |
|---|---|---|---|---|
| 2012/0287122 A1* | 11/2012 | Nadar | ............ | G06T 17/00 |
| | | | | 345/419 |
| 2014/0035913 A1* | 2/2014 | Higgins | ............ | G06T 17/00 |
| | | | | 345/420 |
| 2017/0053456 A1* | 2/2017 | Cho | ............ | G06F 3/013 |
| 2017/0215655 A1* | 8/2017 | Ophardt | ............ | A47K 3/281 |
| | | | | 4/623 |

OTHER PUBLICATIONS

Pachoulakis et al., "Augmented Reality Platforms for Virtual Fitting Rooms," The International Journal of Multimedia & Its Application 4.4 (2012); 35.

Ashdown et al., About the Body Scanner, Cornell University (2006). http://www.bodyscan.human.cornell.edu/scene60df.html.

Wu, "Intelligent Robot Operating in Major Shopping Malls in the Application of Cost Control." School of Management Bohai University, Jinzhou, China.

Peter Mell et al., "The NIST Definition of Cloud Computing", National Institute of Standards and Technology, U.S. Department of Commerce, NIST Special Publication 800-145, Sep. 2011, 7 pages.

\* cited by examiner

400

```
┌─────────────────────────────────────────────────────┐
│ ONE OR MORE PROGRAMS UTILIZE AN IMAGE CAPTURE DEVICE│
│ COMMUNICATIVELY COUPLED TO A DISPLAY DEVICE TO      │──411
│ IDENTIFY A SUBJECT IN A THREE DIMENSIONAL SPACE     │
│ PROXIMATE TO THE DISPLAY DEVICE, WHERE THE THREE    │
│ DIMENSIONAL SPACE IS WITHIN RANGE OF THE IMAGE      │
│ CAPTURE DEVICE                                      │
└─────────────────────────────────────────────────────┘
                          │
                          ▼
┌─────────────────────────────────────────────────────┐
│ ONE OR MORE PROGRAMS UTILIZE THE DATA CAPTURED      │
│ BY THE IMAGE CAPTURE DEVICE TO VIRTUALIZE THE       │──421
│ SUBJECT, RENDERING A MODEL OF THE SUBJECT           │
└─────────────────────────────────────────────────────┘
                          │
                          ▼
┌─────────────────────────────────────────────────────┐
│ ONE OR MORE PROGRAMS OBTAIN DATA RELATED TO         │
│ AN ARTICLE TO ENABLE THE ONE OR MORE                │──431
│ PROGRAMS TO GENERATE A MODEL OF THE ARTICLE         │
└─────────────────────────────────────────────────────┘
                          │
                          ▼
┌─────────────────────────────────────────────────────┐
│ ONE OR MORE PROGRAMS UTILIZE THE DATA RELATED       │
│ TO THE ARTICLE TO CORRELATE THE MODEL OF THE        │──441
│ ARTICLE IN 3D SPACE WITH THE MODEL OF THE SUBJECT   │
└─────────────────────────────────────────────────────┘
                          │
                          ▼
┌─────────────────────────────────────────────────────┐
│ ONE OR MORE PROGRAMS VISUALLY SUPERIMPOSE THE MODEL │──451
│ OF THE ARTICLE WITH THE REFLECTION OF THE SUBJECT   │
└─────────────────────────────────────────────────────┘
```

VIRTUAL TRIAL OF PRODUCTS AND APPEARANCE GUIDANCE IN DISPLAY DEVICE

BACKGROUND

Shopping over the Internet is convenient, but does not provide users with the opportunity to interact with the products, including trying on products that include clothing and accessories. Many times users will return products because the user's vision of how the product will look in-person, and/or how the product will look when worn by the user, does not match the reality.

Trying on products, in-person, is often done in front of a mirror. Many people spend a huge amount of time in front of mirror. Mirrors are installed in dressing rooms, bathrooms, bedrooms, etc. Each day, a given individual will likely spend some time in front of mirror, for example, when getting ready to leave his or her home for the day. The passive mirror and the individual's personal interpretation of the reflection in the mirror provide the individual with a guide as to how he or she looks.

SUMMARY

Shortcomings of the prior art are overcome and additional advantages are provided through the provision of a method for a virtual trial of an object. The method includes: utilizing, by one or more processors in a display device comprising a mirror, an image capture device of the display device, to identify a subject in a three dimensional space proximate to the display device, where the three dimensional space is within range of the image capture device, and where the subject is reflected in the mirror of the display device as a passive reflection; virtualizing, by the one or more processors, the subject to generate a computer model of the subject, where the virtualizing comprises generating mappings between the computer model of the subject and the passive reflection of the subject; obtaining, by the one or more processors, via an Internet connection, a computer model of an article; superimposing, by the one or more processors, the computer model of the article on the computer model of the subject in three-dimensional space, where the superimposing comprises joining the computer model of the subject and the computer model of the article at least one selected reference point; and rendering, by the one or more processors, utilizing the mirror and organic light-emitting diode (OLED) layer of the display device, based on the superimposing, an image comprising the passive reflection of the subject visually superimposed with the computer model of the article, such that a movement by the subject, when obtained by the one or more processors via the image capture device, is reflected in real-time in the image, by utilizing the at least one selected reference point.

Methods, computer program products and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 4 depicts a workflow illustrating certain aspects of an embodiment of the present invention;

DETAILED DESCRIPTION

Figure 1:
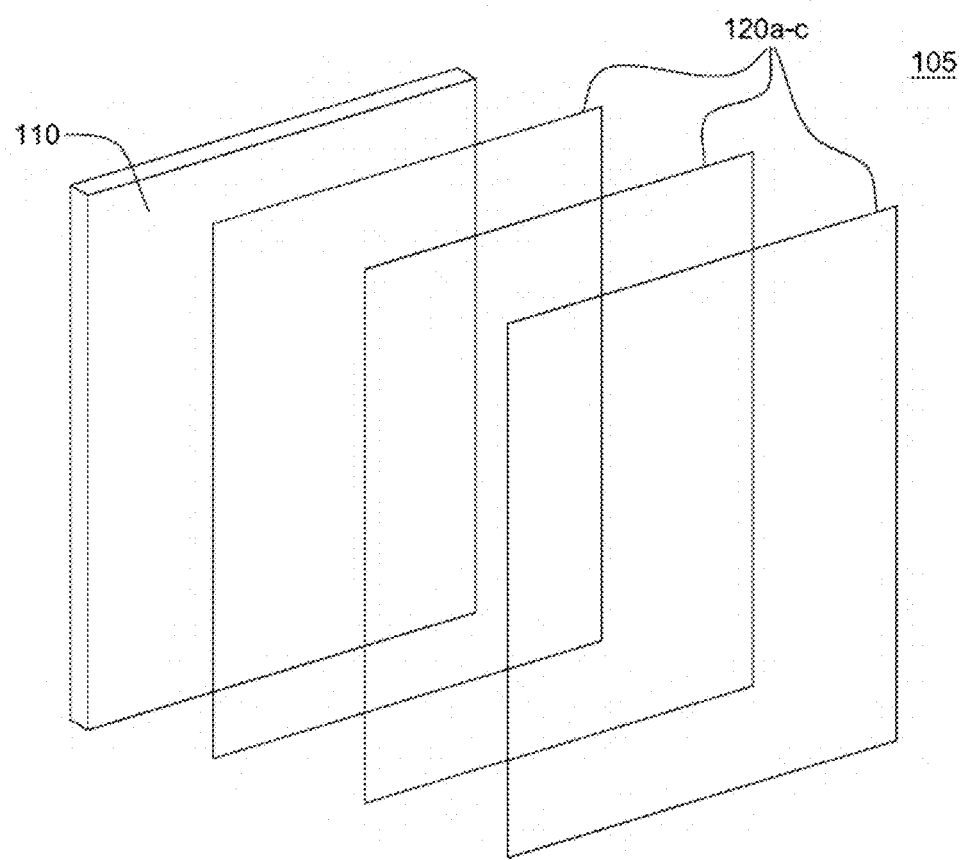
FIG. 1 is a break out view depicting certain aspects of a display device of an embodiment of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 5:
FIG. 5 illustrates certain aspects of some embodiments of the present invention.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 5 as program/utility 40, having a set (at least one) of program modules 42, may be stored in memory 28.

Embodiments of the present invention produce and affix together a model of an individual and a model of a product in order to simulate a representation of the user interacting with the product in a display that includes a passive reflection of the individual. For example, in the case that the product is a wearable item, such as a piece of clothing or an accessory, the user can utilize the simulation to try on the item virtually. To this end, embodiments of the present invention include a display device including a mirror organic light-emitting diode (OLED) and at least one processing unit to render and manipulate three-dimensional (3D) and two-dimensional (2D) models of products relative to a reflected image of a user in the mirror portion of the mirror OLED. As understood by one of skill in the art, other types of displays with similar functionality to the OLED display, including transparent conductor/transistor/pixel structures could be substituted for the OLED display and utilized in embodiments of the present invention. In an embodiment of the present invention, the mirror OLED device renders an image of a user (i.e., the user's reflection in a mirror portion of the mirror OLED) and establishes a connection to the Internet to enable the user to shop for various products available from online sellers. The device may request, receive, and/or render 3D or 2D models of various products, including products available for purchase from online retailers. The display device provides these models of the products to the user, for example, in real-time, with respect to dynamic sizing and positioning relative to the user. Thus, as the user moves and his or her reflection in the device indicates a different position, the device can reposition the object to accommodate the position of the user. Embodiments of the present invention also enable the user to interact with the device to change characteristics of an object, including size, color, etc.

In order to display products relative to the user, in embodiments of the present invention the display device constructs a "virtual" 2D and/or 3D model of a user viewing herself or himself in the mirror portion of the device. In an embodiment of the present invention, the model of the user is transparent such that program code executed by one or more processors integrated or communicatively coupled to the display device can utilize the model when coupling this virtual user to models of products, such that that both the model of the user and the model of the product move/flex/distort realistically, as the user moves. The virtual model of the user is not displayed to the user, but is utilized internally by the program code of the display device to align products to the user such that, to the user, the passive reflection appears to be "trying on" the products. In order to couple the model of the user to the model of the product in a manner that simulates the user trying on the product, in an embodiment of the present invention, the program code utilizes the virtual model to superimpose the product model on the user's passive reflection in the mirror portion of the display device and renders, sizes, and orients the product based on the shopper's position and posture as a function of time. Thus, program code in embodiments of the present invention can modify and/or adjust products, including clothing or accessories, to accommodate the movement of a user. For example, when the user moves and/or poses, the clothes adjust (virtually) to accommodate the user's movement by the program code adjusting both the model of the user and the model of the object(s). For example, the program code provide a dynamic alignment of overlaid contents, including delicate folds of fabric in 3D space.

In an embodiment of the present invention, to enable a user to interact with the product models while utilizing the display device, program code executed by one or more processors integrated or communicatively coupled to the display device, may display each product of a group of products on a different physical or virtual layer of the device or as a thumbnail on a designed product layer. (The utilization of transparent layers in the display device for display of product models is described in greater detail and illustrated by FIG. 1). In an embodiment of the present invention, using hand gesture, voice command, or other human interface modality, the user can select a product from any displayed layer or thumbnail and can modify or adjust a selected product (e.g., change the product from red to green, or from size 12 to 18, etc.).

Certain embodiments of the present invention include a smart "make-over" function where one or more programs can dynamically change, in the mirror OLED system, various aspects of the displayed user model (e.g., the user may want to change her/his hair color from brown to red, or from straight to curly). In an embodiment of the present invention, the program code can connect to the Internet and obtain general fashion tips/trends which it can recommend to a user. For example, the program code could suggest that a user try pants instead of a dress with a particular sweater. A user could utilize this feature to catalog her or his existing wardrobe and accessories and prompt the program code to recommend fashions/looks from the user's existing wardrobe or to recommend to the user to purchase additional items to complement an existing piece. The program code can change the display of the user and/or the products to reflect these recommendations and/or changes. For example, the program code could simulate the user trying on a recommended garment.

Certain embodiment of the present invention can provide a user with guidance regarding aspects of his or her appearance. For example, while standing in front of a display device of the present invention, program code executing on at least one processing circuit can provide the user with personal assistance. For example, in an embodiment of the present invention, the program code can display an alert to the user that there is an issue regarding his or her appearance, including but not limited to, uncombed hair, a mis-aligned button and/or buttonhole combination. In addition to recognizing this issue, embodiments of the present invention provide a user with guidance regarding how to address the issue. For example, the program code provides an augmented reality guide for how to address the perceived issue. Thus, in an embodiment of the present invention, a user utilizes a display device for both its reflective property, as well as to obtain personal assistance, which are both displayed on the display device. For example, a user can utilize an input device, either integrated with the display device or communicatively couples to the device, to select a personal makeup or dressing style. Based on this selection, the program code will overlay step-by-step guidance on the passive reflection of the user. The program code advances through the steps as the image capture device in the display device continuously monitors (e.g., captures images) of the user and the program code utilizes the data captured to identify current activity state of the user and advance the instructional steps based on the progress of the user.

In an embodiment of the present invention, the display device can utilize its connectivity to the Internet to acquire data to address perceived issues in the captured image of a user. For example, if a user is wearing and untied bowtie, and the program code, based on the data captured by the image capture device in the display device, recognizes this as an issue, the program code may search sources available over an Internet connection for a guide to tying a bowtie and utilize this data to provide the step-by-step guide to the user on the display on the display device. In an embodiment of the present invention, the user may upload this (and any) completed activity to a social networking site. This social networking site can be accessed by the program code when looking for information regarding how to address an issue identified in a user's image.

Embodiments of the present invention provide advantages and improvements that are inextricably tied to computer technology because they utilize a display device including an OLED to generate a model of an individual and a product to enable the user to interact with the product in a virtual (simulated) manner. Embodiments of the present invention provide an advantage in electronic commerce because a user considering purchasing items over the Internet can experience those items in a manner that was previously not possible. For example, program code in embodiments of the present invention employs and renders 3D models of the products. The program can produce these models in real-time and dynamically adjust the sizing and positioning of the model with respect to the motion or movement of a user, by dynamically superimposing the model on the user's image. Another advantage over existing ecommerce systems that is provided by certain embodiments of the present invention is that the program code in these embodiments displays a selection of products in different transparent layers or as thumbnails on a product layer of the display device such that a user can cause the program code to manipulate the placement of these products in the display by using hand gestures, voice commands, and/or other human interface modality. For example, a user can utilize an interface of the device to select a product from the displayed layers or thumbnails and based on this selection, the program code will modify or adjust the selected in accordance with the selection of the user. Another advantage provided by certain embodiments of the present invention is that the display device includes functionality enabling a user to manipulate what appears to be his or her own reflected image. Based on user selections, the program code dynamically changes various aspects of the model of the user as "reflected" to the user, for example, the user's hair color or hair style.

FIG. 1 is a breakout view depicting an example of a display device 105 utilized in an embodiment of the present invention. The breakout view is utilized in order to illustrate different aspects that comprise this embodiment. An embodiment of a display device 105 of the present invention includes a mirror OLED display layer 110, which would be oriented as the furthest layer from a user positioned at the front of the display device 105 and on a parallel plane to the user. As the name indicates, the mirror displays a passive reflection of a user who stands in front of the display device 105. As understood by one of skill in the art, an OLED is a light-emitting diode (LED) in which the emissive electroluminescent layer is a film of organic compound that emits light in response to an electric current. This layer of organic semiconductor is situated between two electrodes; typically, at least one of these electrodes is transparent. OLEDs are used to create digital displays in devices such as television screens, computer monitors, portable systems such as mobile phones, handheld game consoles and personal digital assistants (PDAs). In this invention, the OLED display layer 110 is utilized by program code executing on one or more processors integrated into the display device (not pictured) or communicatively coupled to the display device 105 to generate a 2D and 3D model of the user, which is not visible to the user, in order to display an image of a product overlaid on the passive reflection of a the user. Thus, the OLED display layer 110 includes a mirror. As will be discussed herein, program code executed by one or more processors internal to the display device 105 and/or external but accessible to the display device 105 renders a model of the user that is not perceived by the user, who does view his or her reflection in the mirror if the OLED display layer 110.

Returning to FIG. 1, the remaining layer or layers 120a-c that comprise the display device 105 are transparent display layers that are on a parallel plane to the OLED display layer when the display device 105 is assembled. The number of transparent layers 120a-c depicted in this figure is done for illustrative purposes as embodiments of the present invention may include one or more of these transparent layers 120a-c. As explained above, program code executed by one or more processors integrated into the display device 105 and/or communicatively coupled to the display device 105 displays product models on the various layers 120a-c. In an embodiment of the present invention, the program code displays one product on each layer 120a-c such that the display device 105 displays the user interacting with more than one product at one time. In another embodiment of the present invention, the program code displays thumbnails of various products on one layer 120a-c and a based on a user selecting a thumbnail of a given product through an interface of the display device 105, including a touchscreen (not depicted), the program code renders a model of the selected product on a layer of the display device 105 in order to superimpose the product model over the image of the user rendered in the mirror of the OLED display layer 110. In an embodiment of the present invention, the program code renders the product on the OLED display layer 110.

Peripheral or embedded in the display device 105 is an image capture apparatus that captures data related to the user and renders a model of the user, which it adjusts when the user changes position. In an embodiment of the present invention, the image capture apparatus is integrated into the OLED display layer 110 (not pictured). In an embodiment of the present invention, the image capture apparatus is a camera that is integrated with an active plane of the OLED display layer 110. In this embodiment of the present invention, the integrated camera (or other image capture device) detects light reflected off a user, who is positioned in from of the display device 105, utilizing light detection means, including, but not limited to, diodes, Active Pixel Sensors, photodetectors, charge-coupled devices (CCDs), complementary metal-oxide-semiconductor (CMOS) imaging sensors, and/or Cadmium Zinc Telluride (CZT) radiation detectors. Program code utilizes the data captured by the integrated or peripheral image capture apparatus to render a model of the user and to align data points of the model with visual points in the user's natural reflection in the mirror if the OLED display layer 110. For example, in an embodiment of the display device 105 of the present invention that includes an embedded image capture device, the program code may establish a direct mirror pixel to mirror photo detector correspondence and in an embodiment of the display dive 105 that include a peripheral image capture device, the program code may establish a virtual mirror pixel correspondence.

In an embodiment of the present invention, the program code also utilizes the image data detected by the camera to determine the distance of the user from the display device 105 and to determine whether the user is in motion. The program code updates the model of the user to reflect the orientation and motion of the user. An embodiment of the present invention includes both a camera and photodetectors. While program code utilizes the camera to determine the distance of a user from the display device 105 and the position of the user, the program code utilizes a layer of substantially transparent photodetectors (not pictured) to sense movement of the user. The program code utilizes data from the camera and the photodetectors to render and adjust the model, e.g., and align the model with the passive reflection, of the user in the display device 105.

FIG. 1 includes one example of an orientation of an OLED display layer 110 and additional transparent layers 120a-c utilized in an embodiment of the present invention. Further embodiments of the present invention may include only a single transparent layer 120a-c and may also reverse the orientations of the transparent layer(s) 120a-120c relative to a user. Additionally, an embodiment of the present invention is comprised on one layer which includes an OLED display layer 110. This embodiment of the present invention may also include photodetectors oriented of the OLED display layer 110.

Figure 2:
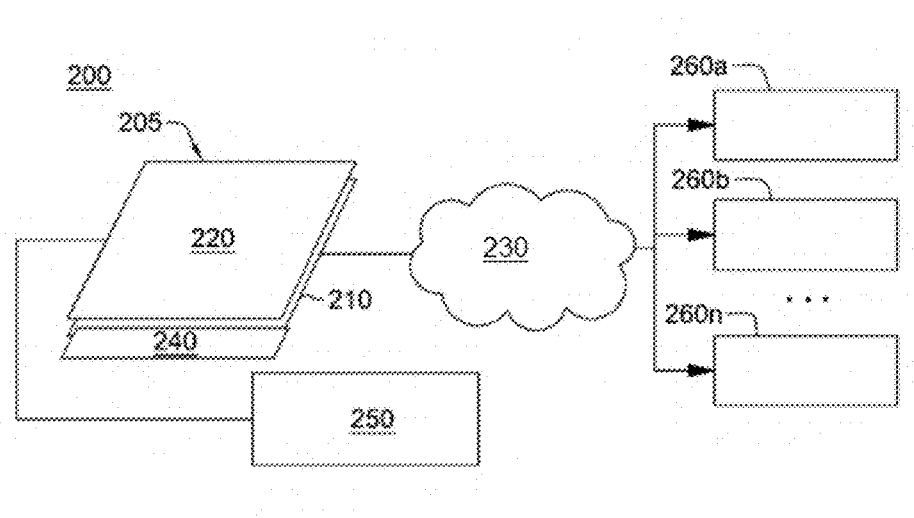
FIG. 2 depicts aspects of a technical environment into which aspects of an embodiment of the present technique can be integrated.

FIG. 2 is an embodiment of a technical environment 200 into which aspects of an embodiment of the present invention can be integrated. The technical environment includes a display device 205 (e.g., FIG. 1, 105) comprising a mirror OLED display 210 (e.g., FIG. 1, 110) and at least one transparent upper layer 220 (e.g., FIG. 1, 120*a-c*). As aforementioned, an embodiment of the present invention may comprise a mirror OLED display 210 with a transparent upper layer 220. Returning to the embodiment of FIG. 2, the display device 205 is connected to the Internet 230 and communicates over the Internet 230 connection (which can be either wired or wireless, including radio frequency) to obtain 3D and 2D models of products, for example, from one or more ecommerce websites 260*a-n*. The display device 205 includes either an embedded or peripheral image capture device 240, including a camera, in this embodiment, to capture image data related to the user. In an embodiment of the present invention, program code executed by one or more processors 250, which are either embedded in the display device 205 and/or communicatively coupled to the display device 205, obtain the image data and utilize the image data to generate a model of the user (e.g., 2D or 3D), which the program code retains in a memory (not pictured) internal to the display device 205 and/or accessible to the program code but external to the display device 205. The mirror portion of the mirror OLED display 110 reflects a passive reflection, which the program code maps to the (not visible) model that the program code generated. The program code superimposes this user model virtually in 3D space over the passive reflection—the model is not visible to a user. In an embodiment of the present invention, the program code establishes a direct mirror pixel to mirror photo detector correspondence for the image capture device 240 so that the program code can dynamically adjust the rendered reflection of a user to reflect movements of the user in 3D space.

Figure 3:
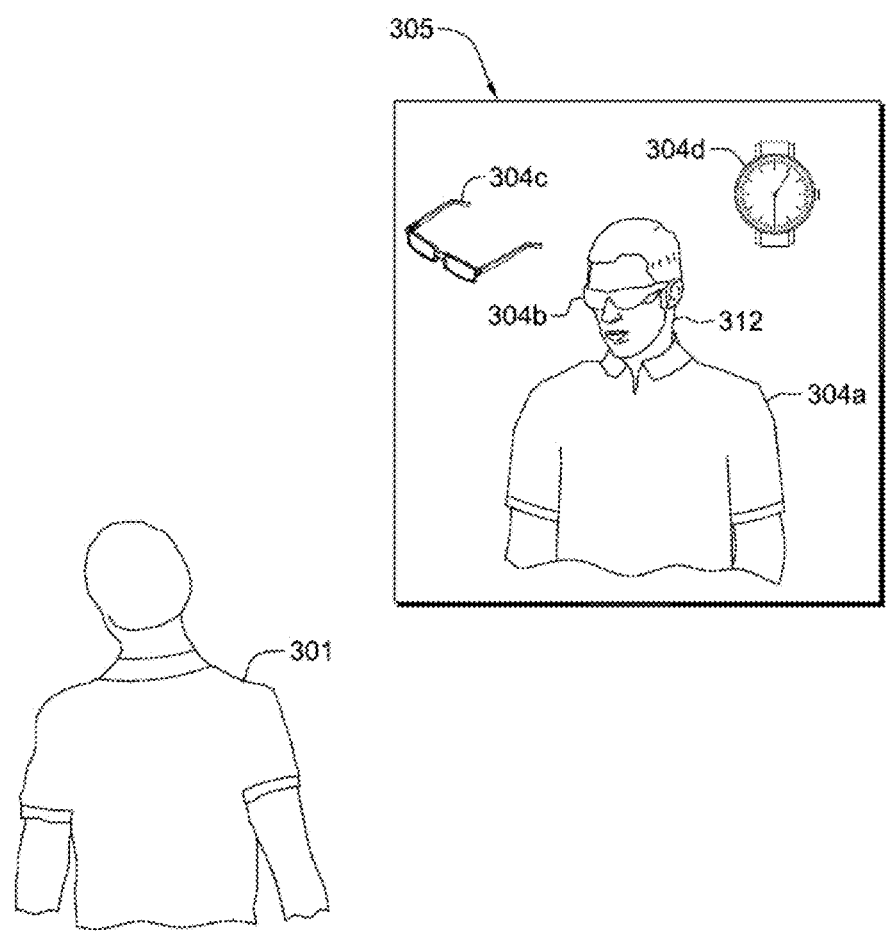
FIG. 3 illustrates certain aspects of some embodiments of the present invention.

FIG. 3 illustrates an example of a user utilizes an embodiment of the present invention. As seen in FIG. 3, when a user 301 stands in front of a display device 305 of an embodiment of the present invention, because the display device 305 comprises a mirror OLED display 110 (FIG. 1) and either an integrated or peripheral image capture device, the program code executing on one or more processors internal or communicatively coupled to the display device 305 renders generates a model of the user (e.g., 2D, 2.5D, 3D, etc.) and the mirror in the mirror OLED display 110 reflect an image 312 of the user. The program code of the display device 305 obtains, via an Internet connection, from various sources, models of products. In this example, the program code has obtained and renders products that include a shirt 304*a*, a first pair of sunglasses 304*b*, a second pair of sunglasses 304*c*, and a watch 304*d*. The program code automatically overlays the model of the products 304*a-b* selected by the user on the user's mirror image 312. When the user moves, the program code, which, utilizing the model of the user, has determined at least one reference point between the positioning of the user and the objects, automatically adjusts the product models 304*a-b* to reflect the new positioning (and/or the movement) of the user, which is passively captured in the reflection by the mirror.

In an embodiment of the present invention, the program code will display the model 304*a-b* of the items that the user is trying on at a given time on subsequent transparent layers of the display device 305 so that the user will a feel like the products are showing in different depth, like the products are arranged in shopping complex.

In an embodiment of the present invention, the product models obtained by the program code include metadata, which will include information that will assist the program code in positioning the product correctly relative to the user model and thus, the user reflection 312. For example, the metadata may include the part of the body upon which the product is used. In an embodiment of the present invention, the user selects a product to try, by utilizing a user interface of the display device 305. For example, the user may select one or more products to try on using a hand gesture, voice command, or other human interface modality. Upon obtaining a selection of a product from the user, the program code repositions the selected product and aligns the product with the user model and thus, with human body shown in the mirror image 312. The program code analyzes the image data captured by the aforementioned image capture device to identify the different body parts of the user 301 rendered in the mirror image 312. In an embodiment of the present invention, the program code orients products relative to the mirror image 312 based on product metadata, including an identification of body parts where it is used.

FIG. 4 is a workflow 400 that includes aspects of an embodiment of the present invention. For ease of understanding, the workflow contains references to aspects of an embodiment of the present invention as depicted in FIG. 2. As aforementioned and illustrated in FIG. 2, an embodiment of the present invention includes a display device 205, one or more processors 250, either internal and/or accessible to the display device 205 to execute one or more programs, either an embedded or peripheral image capture device 240, and a communications connection to the Internet 230. The display device includes a mirror OLED display 210 and may also include at least one transparent upper layer 220 (or lower layer, depending on the orientation of the display device 205).

Referring to FIG. 4, in an embodiment of the present invention, program code executed by one or more processors 250 utilizes the image capture device 240 to identify a subject in a three-dimensional space proximate to the display device 205, where the three-dimensional space is within a view (e.g., within range) of the image capture device 240 (411). In an embodiment of the present invention the program code identifies the subject by detecting light reflected off the subject and onto the OLED display 210. The image capture device 240 in this example may include, but not limited to, diodes, Active Pixel Sensors, photodetectors, charge-coupled devices (CCDs), complementary metal-oxide-semiconductor (CMOS) imaging sensors, and/or Cadmium Zinc Telluride (CZT) radiation detectors. The program code utilizes the data captured by the integrated or peripheral image capture device 240 to virtualize the subject, rendering a model of the subject (421). For example, in an embodiment of the present invention, the program code virtualizes the subject in 3D space by rendering the subject as a virtual 3D model of a 2D model in 3D space. In an embodiment of the present invention, the program code retains a representation of the virtualized subject in a memory either internal to the display device 205 and/or accessible to the display device 205 utilizing a communications connection.

In an embodiment of the present invention, the program code renders the reflection of the subject in the mirror of the mirror OLED display 201 of the display device 205. The program code superimposes the resultant model in 3D space mapping the rendered pixels of the reflected image to mirror photo detector correspondence to establish correspondence between the image capture device 240 and the virtual mirror pixels of the mirror OLED display 210. In an embodiment of the present invention, the program code maps the location of the subject to coordinates on the mirror OLED display 210 in order to display products relative to the passive reflection in a consistent position relative to the position of the subject even when the subject moves, causing changes in the passive reflection.

Returning to FIG. 4, the program code obtains data related to an article that either comprises a 3D or 2D model of the article or is sufficient to enable the program code to generate a model of the article (431). In an embodiment of the present invention, the model is 3D, 2D, and/or 2.5D. The program code may obtain the data from a number of sources, for example, via the aforementioned Internet 230 connection. The program code may obtain the data from an inventory (dBase) accessible via the Internet 230 connection.

In an embodiment of the present invention, the program code utilizes the data related to the article to correlate the model of the article in 3D space with the model of the subject (441). As aforementioned, program code generated the model of the subject by utilizing data from either an embedded and/or peripheral camera (e.g., an image capture device 240). Based on superimposing the models, the program code visually superimposes the model of the article with the reflection of the subject (451). In an embodiment of the present invention, the reflection is perceived by the subject (i.e., user) as a natural (mirrored) reflection is visible in a mirror portion of the OLED layer 310 and the virtual model generated by the program code is not visible. In other embodiments of the present invention, the user perceives, when looking at the display device 305 both the natural reflection and the model of the article. In an embodiment of the present invention, the program code joins the model of the article and the model of the subject at certain points.

In an embodiment of the present invention, based on the movement of the subject, the program code, based on data from the image capture device 240, automatically changes the superimposed model of the subject and model of the article so that the displayed model of the article can mirror the movement and the program code can continuously dynamically render the changes in the OLED layer 310.

In an embodiment of the present invention, not only can a display device provide a user with the opportunity to try on new items, the program code can also assist a user in improving his or her appearance (e.g., wearing a chosen clothing item or accessory more effectively). Referring back to FIG. 2, in an embodiment of the present invention, the one or more processors 250, which are either embedded in the display device 205, executed program code to provide a user with visual guidance to assist the user in addressing a discrepancy in his or her appearance, as perceived by the program code. The program code displays this visual guidance on a transparent upper layer 220 of the display device 205. This functionality is illustrated in FIG. 5.

FIG. 5 depicts certain functionality of an embodiment of the present invention from the perspective of a user. As seen in FIG. 5, a user 501 appears in a location in three dimensional space that is proximate to a display device 505, which is within a range of the embedded or peripheral image capture device (not pictured in FIG. 5; e.g., FIG. 2, 240). As seen in FIG. 5, when the user 501 stands in front of a display device 505 of an embodiment of the present invention, because the display device 505 comprises a mirror OLED display 110 (FIG. 1) and either an integrated or peripheral image capture device (not pictured in FIG. 5; e.g., FIG. 2, 240), the program code executing on one or more processors internal or communicatively coupled to the display device 505 renders generates a model of the user (e.g., 2D, 2.5D, 3D, etc.) and the mirror in the mirror OLED display 110 (FIG. 1) reflect an image 512 of the user. The program code of the display device 305 analyzes the model of the user (e.g., performing a contextual analysis, to identify if a relative orientation of a section of the model of the subject includes a discrepancy. In order to perform this analysis, in an embodiment of the present invention, the program code obtains predefined image association patterns and rules to utilize in this analysis. Based on identifying a discrepancy, the program code identifies predefined steps comprising an activity to address the discrepancy and projects a visual representation 507 of each of the sequential steps a transparent layer 210 (FIG. 2) of the display device 505 proximate to a passive reflection 512 of the subject 501 on a mirror OLED display 110 (FIG. 1) of the display device 505. In an embodiment of the present invention, the program code, determines at least one reference point between the positioning of the user and the location in the model of the discrepancy, such that program code can advance the visual representation 507 of each of through sequential steps, as the user 501 completes each of the steps. For example, the step-by-step guidance of a visual representation 507, which can be animated, will appear to align with the reflected image 512 of the user. In this example, the visual representation 507 provides a user 501 with the steps of how to tie a tie because the program code identified that the user 501 was wearing a tie that was not properly tied.

Figure 6:
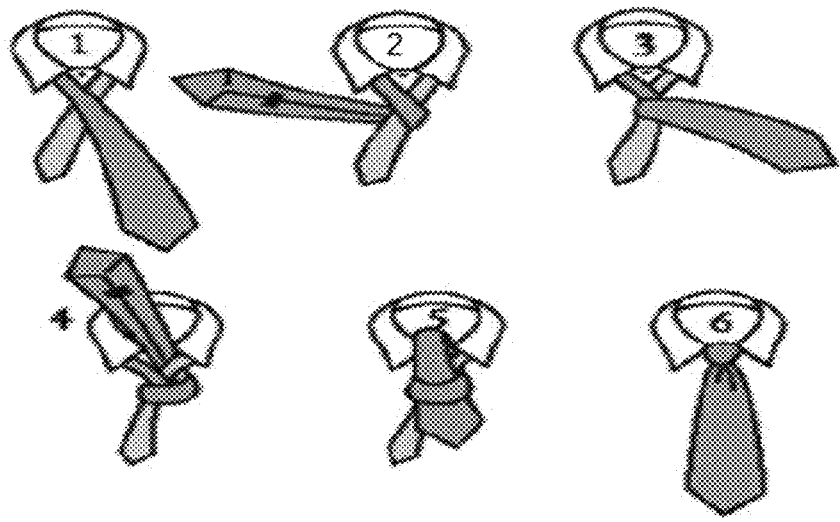
FIG. 6 illustrates certain aspects of some embodiments of the present invention.

FIG. 6 depicts the various steps of visual guidance 607 that the program code can project on a transparent layer 220 (FIG. 2) of the display device 505 (FIG. 5) to take a user through addressing a deficiency identified by the program code. Based on continuously monitoring the movement of the user 501 (FIG. 5) the program code progresses through the steps of the visual representation 607, so that the visual representation 607 aligns with the reflected image 512 (FIG. 5) of the user. This visual representation 607 will take the user 501 (FIG. 5) through the steps of tying a tie.

Figure 7:
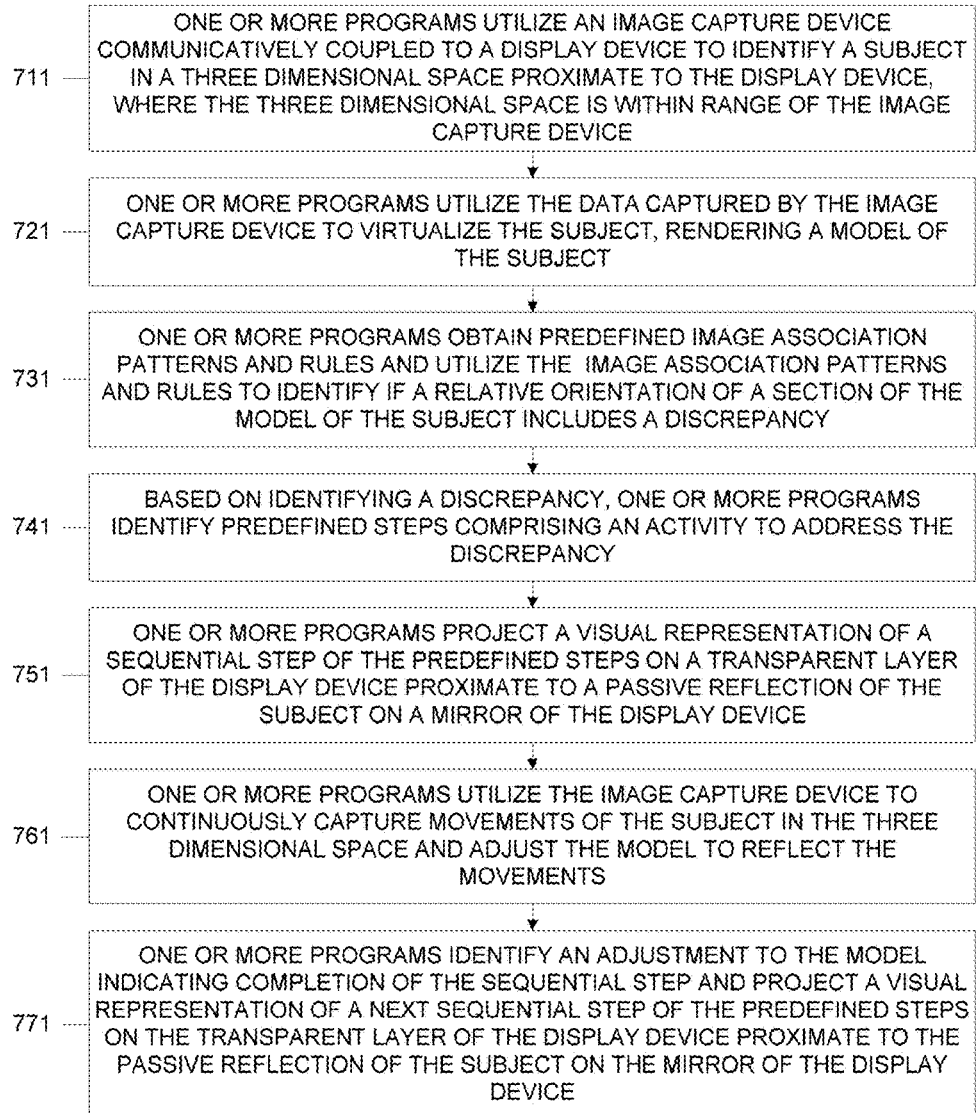
FIG. 7 depicts a workflow illustrating certain aspects of an embodiment of the present invention.

FIG. 7 is a workflow 700 that is relevant to the aspects of an embodiment of the present invention illustrated in FIGS. 5-6. For ease of understanding the workflow 700 references physical elements of the display device depicted in FIG. 2. In an embodiment of the present invention, program code executing on one or more processors (e.g., FIG. 2, 250) either internal to or communicatively couples to a display device 205 (FIG. 2), utilize an image capture device 240 (FIG. 2) internal to or communicatively coupled to the display device 205 (FIG. 2) to identify a subject in a three dimensional space proximate to the display device 205 (FIG. 2), where the three dimensional space is within range of the image capture device 240 (FIG. 2) (711). The program code utilizes data captured by the image capture device 240 (FIG. 2) to virtualize the subject, rendering a model of the subject (721).

The program code obtains predefined image association patterns and rules and utilize the image association patterns and rules to identify if a relative orientation of a section of the model of the subject includes a discrepancy (731). In an embodiment of the present invention, the program code obtains the image association patterns and rules over an Internet 230 (FIG. 2) connection and/or from a local or locally accessible memory device. In an embodiment of the present invention, the pre-defined patterns and rules that the program code utilizes to analyze a model of an individual are stored on a server accessible to the display device. The rules may identify the relative orientation of different image objects or image sections and determined whether there is a discrepancy based on whether these items are correctly associated or not. For example, if a user is wearing a shirt that is incorrectly buttoned. The program code will identify an improper association, so user will identify this discrepancy (e.g., incorrect association), and provide guidance related to how to correct this discrepancy (e.g., the program code will provide the proper association and will highlight the wrong association).

Based on identifying a discrepancy, the programs identifies predefined steps comprising an activity to address the discrepancy (741). The program code may obtain these predefined steps over an Internet 230 (FIG. 2) connection and/or from a local or locally accessible memory device. In an embodiment of the present invention, the program code projects a visual representation of a sequential step of the predefined steps on a transparent layer 210 (FIG. 2) of the display device 205 (FIG. 2) proximate to a passive reflection of the subject on a mirror of the display device 205 (FIG. 2) (751). The visual representation may be an animation. In an embodiment of the present invention, a memory device internal to or accessible to the program code may contain predefined animated steps to complete various activities (e.g., typing a bow tie, styling hair in a braid) that correct deficiencies that the program code may utilize.

In an embodiment of the present invention, the program code utilizes the image capture device 240 (FIG. 2) to continuously capture movements of the subject in the three dimensional space and adjust the model to reflect the movements (761). The program code identifies an adjustment to the model indicating completion of the sequential step and project a visual representation of a next sequential step of the predefined steps on the transparent layer of the display device proximate to the passive reflection of the subject on the mirror of the display device (771). In an embodiment of the present invention, the program code moves through the steps of the visual representation as the subject completes the steps, until the discrepancy is addressed. In an embodiment of the present invention, the program code, utilizing image data from the image capture device, identifies if a user is not completing the steps that comprise the visual representation correctly and will adjust the guidance accordingly, for example, by displaying appropriate suggestions on the transparent display layer.

In an embodiment of the present invention, rather than project guidance onto a transparent layer of the display device, the program code will project a notification to the user of the discrepancy and accept input from the user regarding how to progress, including providing the visual representation of the guidance. In an embodiment of the present invention, when after the program code alerts the user to a deficiency, the user may select the type of guidance that the program code will provide to correct a deficiency. For example, the user may select one or more personalized makeup and dressing styles (e.g., a step by step guide to creating a particular hair style, dressing in a complicated/unusual garment, etc.) that will aid the program code in displaying appropriate guidance. In an embodiment of the present invention, the program code displays the guidance in an augmented reality manner. In an embodiment of the present invention, the user may select the one or more makeup and/or dressing styles from a mobile application, and/or from social networking site. In an embodiment of the present invention, based on preferences provided by the user, the program code selects guidance to address a discrepancy. In an embodiment of the present invention, based on user input, the program code may upload the data captured of a user completing an activity to a social media or other websites and additional display devices may access this data to create visual representations pertaining to addressing this discrepancy for future users.

Figure 8:
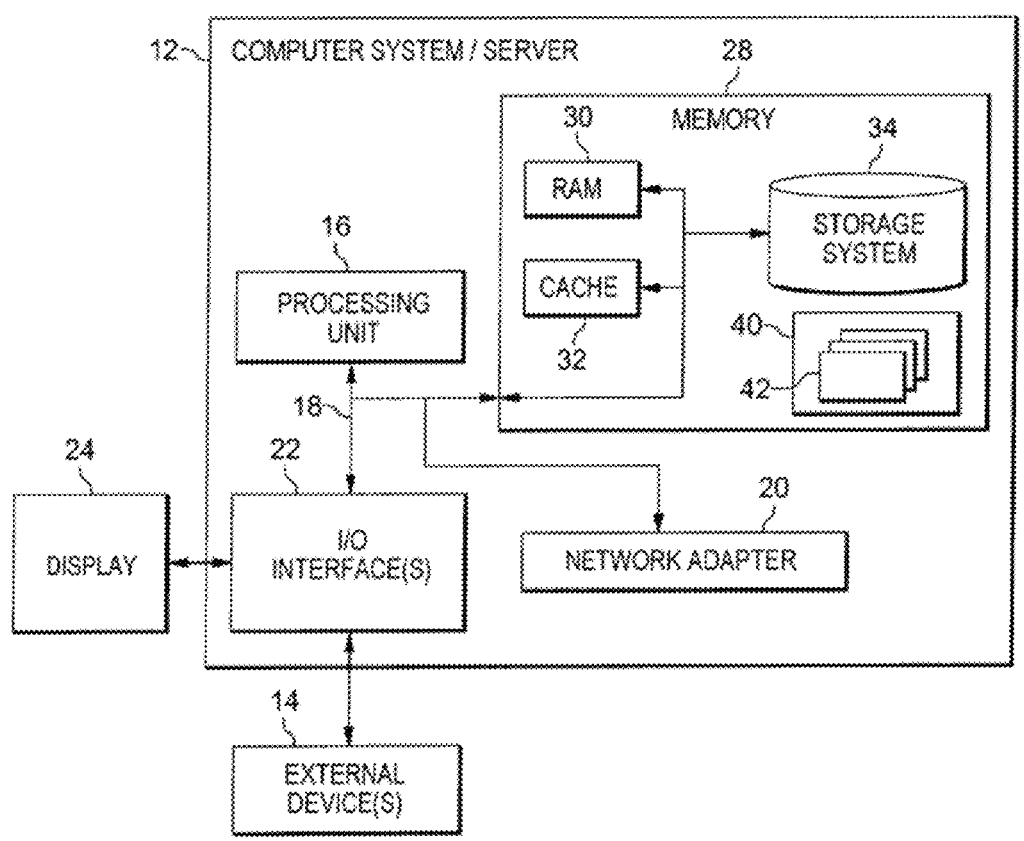
FIG. 8 depicts one embodiment of a computing node that can be utilized in a cloud computing environment.

Referring now to FIG. 8, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the one or more processors 250, which are either embedded in the display device 205 and/or communicatively coupled to the display device (FIG. 2) can be understood as cloud computing node 10, and if not a cloud computing node 10, then one or more general computing node that includes aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
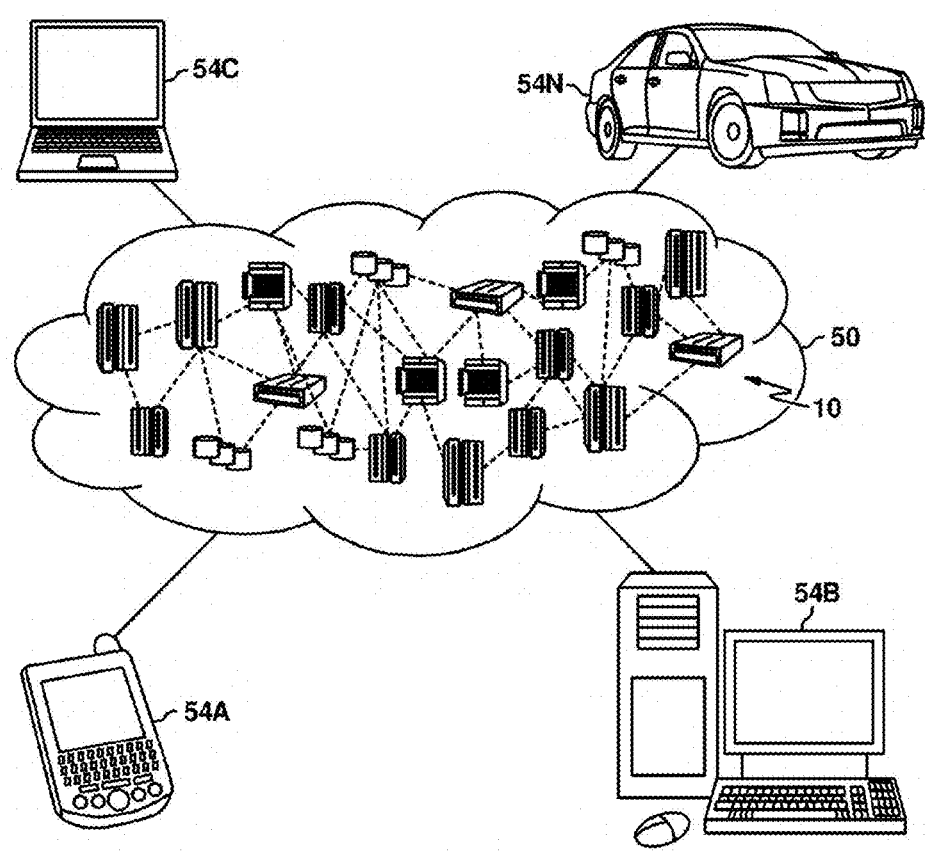
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
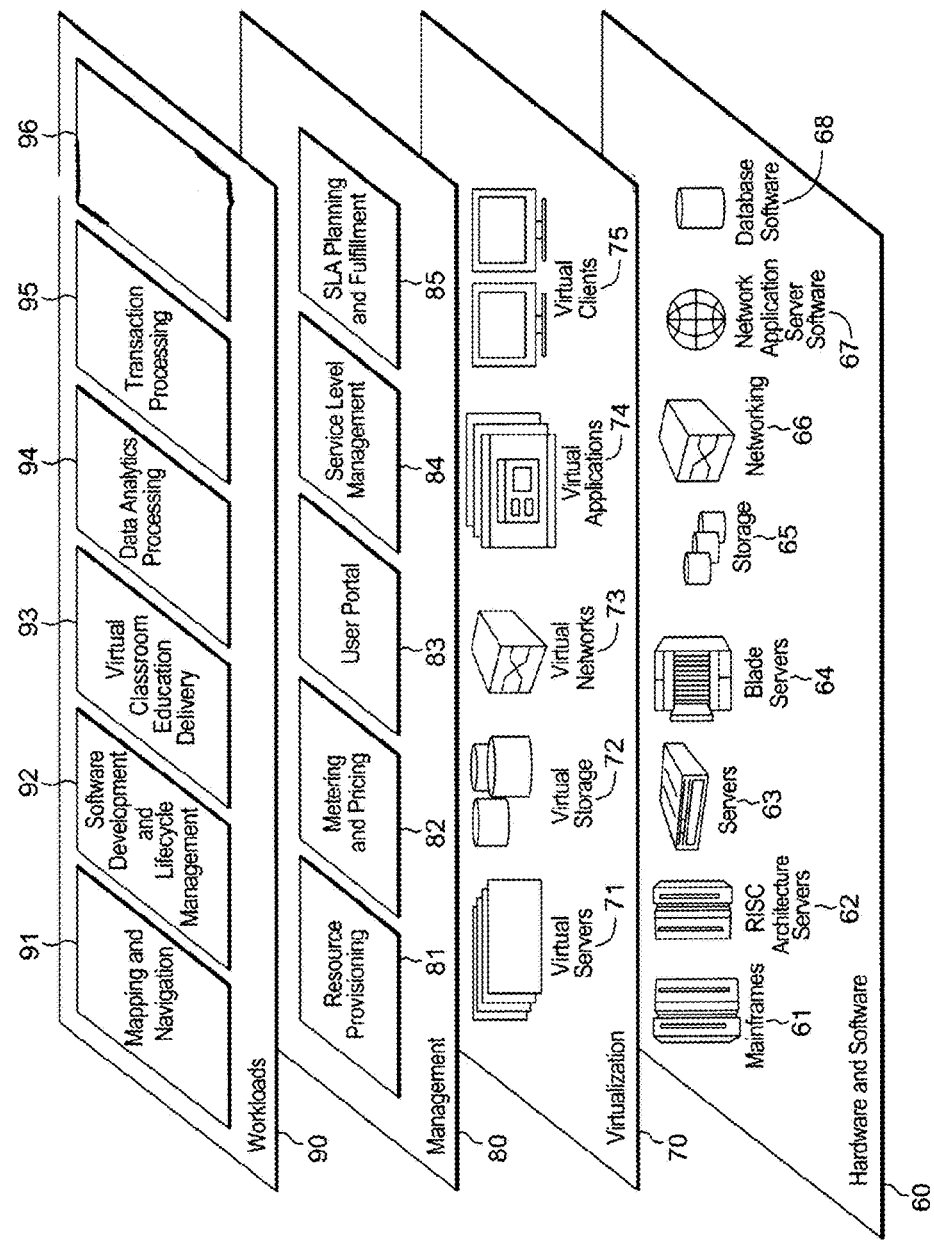
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating models of products and/or users for display in the display device of embodiments of the present invention 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:

utilizing, by one or more processors in a display device comprising a mirror, an image capture device of the display device to identify a subject in a three-dimensional space proximate to the display device, wherein the three-dimensional space is within range of the image capture device, and wherein the subject is reflected in the mirror of the display device as a passive reflection;

virtualizing, by the one or more processors, the subject to generate a three dimensional computer model of the subject that is not displayed in the display device, wherein the virtualizing comprises generating mappings between the computer model of the subject and the passive reflection of the subject, and wherein virtualizing the subject in three dimensions in the computer model comprises rendering the subject as a virtual three dimensional model of a two dimensional model in the three-dimensional space;

retaining, by the one or more processors, the three dimensional computer model of the subject, in a memory;

obtaining, by the one or more processors, via an Internet connection, a computer model of an article;

superimposing, by the one or more processors, the computer model of the article on the computer model of the subject in three-dimensional space, wherein the superimposing comprises joining the computer model of the subject and the computer model of the article at least one selected reference point;

rendering, by the one or more processors, utilizing the mirror and an organic light-emitting diode (OLED) layer of the display device, based on the superimposing, an image comprising the passive reflection of the subject visually superimposed with the computer model of the article, such that a movement by the subject, from an initial position to a new position, when obtained by the one or more processors via the image capture device, is reflected in movement of the computer model of the article comprising real time in the image being synchronized with movement of the subject, as reflected in the passive reflection comprising the image, by utilizing the at least one selected reference point; and based on the movement by the subject in the three-dimensional space, dynamically re-aligning, by the one or more processors, the article, in real-time, with the passive reflection, to coordinate with the movement by the subject.

2. The method of claim 1, wherein the rendering the image comprises displaying the computer model of the article on a transparent layer of the display device adjacent and parallel to the OLED layer.

3. The computer-implemented method of claim 2, further comprising:

obtaining, by the one or more processors, via an Internet connection, another computer model of another article; and generating, by the one or more processors, a visual representation of the other article and displaying the visual representation on a transparent layer of the display device selected from the group consisting of: another transparent layer, wherein the other transparent layer is adjacent and parallel to the transparent layer, and the transparent layer.

4. The computer-implemented method of claim 3, further comprising:

obtaining, by the one or more processors, a selection of the representation;

based on the selection, joining, by the one or more processors, the computer model of the subject and the other computer model of the other article at least one selected reference point; and visually superimposing, by the one or more processors, the other computer model of the other article on the passive reflection.

5. The computer-implemented method of claim 1, further comprising:

obtaining, by the one or more processors, an indication from the image capture device of a change in position of the subject; and based on the indication and the selected at least one reference point, adjusting the image in real-time to mirror the change, wherein adjusting the image comprises adjusting the rendered computer model of the article to coordinate with changes in the passive reflection.

6. The computer-implemented method of claim 1, wherein the rendering comprises sizing and orienting the computer model of the article relative to the passive reflection based on a position and a posture of the subject as a function of time.

7. The computer-implemented method of claim 1, wherein the computer model of the article comprises data describing dynamic sizing of the article and positioning of the article relative to the subject.

8. The computer-implemented method of claim 1, further comprising:

obtaining, by the one or more processors, a request to alter a characteristic of the article; and based on the request, adjusting, by the one or more processors, the image in real-time to reflect the requested change.

9. The computer-implemented method of claim 1, wherein the superimposing further comprises:

determining, by the one or more processors, a dynamic alignment of the computer model of the article and the computer model of the subject in three dimensional space; and utilizing, by the one or more processors, the dynamic alignment to select the at least one reference point.

10. A computer program product comprising:

a non-transitory computer readable storage medium readable by one or more processors and storing instructions for execution by the one or more processors for performing a method comprising:

utilizing, by the one or more processors in a display device comprising a mirror, an image capture device of the display device, to identify a subject in a three dimensional space proximate to the display device, wherein the three dimensional space is within range of the image capture device, and wherein the subject is reflected in the mirror of the display device as a passive reflection;

virtualizing, by the one or more processors, the subject to generate a three dimensional computer model of the subject that is not displayed in the display device, wherein the virtualizing comprises generating mappings between the computer model of the subject and the passive reflection of the subject, and wherein virtualizing the subject in three dimensions in the computer model comprises rendering the subject as a virtual three dimensional model of a two dimensional model in the three-dimensional space;

retaining, by the one or more processors, the three dimensional computer model of the subject, in a memory;

obtaining, by the one or more processors, via an Internet connection, a computer model of an article;

superimposing, by the one or more processors, the computer model of the article on the computer model of the subject in three-dimensional space, wherein the superimposing comprises joining the computer model of the subject and the computer model of the article at least one selected reference point;

rendering, by the one or more processors, utilizing the mirror and an organic light-emitting diode (OLED) layer of the display device, based on the superimposing, an image comprising the passive reflection of the subject visually superimposed with the computer model of the article, such that a movement by the subject, from an initial position to a new position, when obtained by the one or more processors via the image capture device, is reflected in movement of the computer model of the article comprising the image being synchronized with movement of the subject, as reflected in the passive reflection comprising the image, by utilizing the at least one selected reference point; and based on the movement by the subject in the three-dimensional space, dynamically re-aligning, by the one or more processors, the article, in real-time, with the passive reflection, to coordinate with the movement by the subject.

11. The computer program product of claim 10, the rendering the image comprising displaying the computer model of the article on a transparent layer of the display device adjacent and parallel to the OLED layer.

12. The computer program product of claim 11, further comprising:

obtaining, by the one or more processors, via an Internet connection, another computer model of another article; and generating, by the one or more processors, a visual representation of the other object and displaying the visual representation on a transparent layer of the display device selected from the group consisting of: another transparent layer, wherein the other transparent layer is adjacent and parallel to the transparent layer, and the transparent layer.

13. The computer program product of claim 12, further comprising:

obtaining, by the one or more processors, a selection of the representation;

based on the selection, joining, by the one or more processors, the computer model of the subject and the other computer model of the other article at the at least one selected reference point; and visually superimposing, by the one or more processors, the other computer model of the other article on the passive reflection.

14. The computer program product of claim 10, further comprising:

obtaining, by the one or more processors, an indication from the image capture device of a change in position of the subject; and based on the indication and the at least one selected reference point, adjusting the image in real-time to mirror the change, wherein adjusting the image comprises adjusting the rendered computer model of the article to coordinate with changes in the passive reflection.

15. The computer program product of claim 10, wherein the rendering comprises sizing and orienting the computer model of the article relative to the passive reflection based on a position and a posture of the subject as a function of time.

16. A display device comprising:

a memory;

one or more processors in communication with the memory;

an organic light-emitting diode (OLED) layer in communication with the one or more processors comprising a mirror;

one or more transparent layers oriented parallel to the OLED layer in communication with the one or more processors;

an image capture device in communication with the one or more processors; and program instructions executable by the one or more processors via the memory to perform a method, the method comprising:

utilizing, by the one or more processors in a display device, an image capture device of the display device, to identify a subject in a three dimensional space proximate to the display device, wherein the three dimensional space is within range of the image capture device, and wherein the subject is reflected in the mirror of the display device as a passive reflection;

virtualizing, by the one or more processors, the subject to generate a three dimensional computer model of the subject that is not displayed in the display device, wherein the virtualizing comprises generating mappings between the computer model of the subject and the passive reflection of the subject, and wherein virtualizing the subject in three dimensions in the computer model comprises rendering the subject as a virtual three dimensional model of a two dimensional model in the three-dimensional space;

retaining, by the one or more processors, the three dimensional computer model of the subject, in a memory;

obtaining, by the one or more processors, via an Internet connection, a computer model of an article;

superimposing, by the one or more processors, the computer model of the article on the computer model of the subject in three-dimensional space, wherein the superimposing comprises joining the computer model of the subject and the computer model of the article at least one selected reference point;

rendering, by the one or more processors, utilizing the mirror and an organic light-emitting diode (OLED) layer of the display device, based on the superimposing, an image comprising the passive reflection of the subject visually superimposed with the computer model of the article, such that a movement by the subject, from an initial position to a new position, when obtained by the one or more processors via the image capture device, is reflected in movement of the computer model of the article comprising the image being synchronized with movement of the subject, as reflected in the passive reflection comprising the image, by utilizing the at least one selected reference point; and based on the movement by the subject in the three-dimensional space, dynamically re-aligning, by the one or more processors, the article, in real-time, with the passive reflection, to coordinate with the movement by the subject.

* * * * *